United States Patent [19]
Dennis

[11] Patent Number: 5,876,047
[45] Date of Patent: Mar. 2, 1999

[54] UTILITY CART

[76] Inventor: Macy S. Dennis, 221 N. Demande, Lafayette, La. 70503

[21] Appl. No.: 596,951

[22] Filed: Feb. 5, 1996

[51] Int. Cl.$^6$ ........................................................ B62B 3/02
[52] U.S. Cl. ............................... 280/47.35; 280/47.371; 296/22
[58] Field of Search .......................... 280/47.11, 47.34, 280/47.35, 47.371, 79.2, 87.01, 651, 655, 655.1; 296/22; 220/902, 73.83; 16/115

[56] References Cited

U.S. PATENT DOCUMENTS

| | | | |
|---|---|---|---|
| D. 183,950 | 11/1958 | Skallar | D14/3 |
| D. 295,338 | 4/1988 | Hays | 280/87.01 |
| 576,746 | 2/1897 | Spangler | 280/87.01 |
| 1,176,106 | 3/1916 | True . | |
| 1,375,121 | 4/1921 | Swartzbaugh | 296/22 |
| 1,455,395 | 5/1923 | Exum | 296/24 |
| 1,548,266 | 8/1925 | Hall | 280/87.01 |
| 1,654,330 | 12/1927 | Jenkins . | |
| 1,760,854 | 5/1930 | Wright | 296/24 |
| 1,948,937 | 2/1934 | Muth | 296/22 |
| 1,962,454 | 6/1934 | Meanor et al. | 296/22 |
| 2,193,411 | 5/1940 | Sheldon | 87/1 |
| 2,603,500 | 7/1952 | Messier | 290/22 |
| 2,771,318 | 11/1956 | Jagsch | 296/26 |
| 3,591,194 | 7/1971 | Vega | 280/47.26 |
| 3,677,571 | 7/1972 | Maturo, Jr. et al. . | |
| 3,873,114 | 3/1975 | Brown | 280/79.2 |
| 3,874,531 | 4/1975 | Mayo | 214/130 R |
| 3,889,967 | 6/1975 | Sauer | 280/47.35 |
| 3,940,175 | 2/1976 | Robison | 296/22 |
| 4,550,931 | 11/1985 | Ziaylek, Jr. | 280/655 |
| 4,724,681 | 2/1988 | Bartholomew et al. | 62/239 |
| 4,735,426 | 4/1988 | McConnell | 280/47.35 |
| 4,846,493 | 7/1989 | Mason | 280/655 |
| 4,863,075 | 9/1989 | Romer | 222/610 |
| 4,865,346 | 9/1989 | Carlile | 280/654 |
| 4,976,448 | 12/1990 | Wickershaw et al. | 280/47.2 |
| 5,249,823 | 10/1993 | McCoy et al. | 280/47.34 |
| 5,306,029 | 4/1994 | Kaiser, II | 280/30 |
| 5,380,022 | 1/1995 | Dennis | 280/47.35 |
| 5,465,988 | 11/1995 | Dennis | 280/47.35 |
| 5,480,170 | 1/1996 | Kaiser, II | 280/47.34 |
| 5,626,352 | 5/1997 | Grace | 280/655 |

FOREIGN PATENT DOCUMENTS 435595   12/1947   Italy .

*Primary Examiner*—Brian L. Johnson
*Assistant Examiner*—Frank Vanaman
*Attorney, Agent, or Firm*—John M. Harrison

[57] ABSTRACT

A utility cart which includes a cart frame fitted with a pair of fixed rear wheels and a pair of steerable front wheels and further including an ice chest or ice chest receptacle with double hinged lids and lid covers and a storage compartment located adjacent to the ice chest. Removable chair supports are upward-standing from the storage compartment for stacking one or more folded lawn chairs or the like, supporting an auxiliary table top and to provide a location for hanging a trash bag. Two or more tables are hinged to the cart frame in drop-leaf fashion for selected horizontal extension and support by means of hinged members. One of the ice chest lid covers doubles as a table and may be optionally supported by a collapsible handle optionally used for towing the utility cart. A pair of vertically-aligned umbrella brackets receive an umbrella support to shade the utility cart and the utility cart components, including the cart walls, and ice chest lids, are constructed of expanded foam insulation sandwiched between plastic sheets.

20 Claims, 5 Drawing Sheets

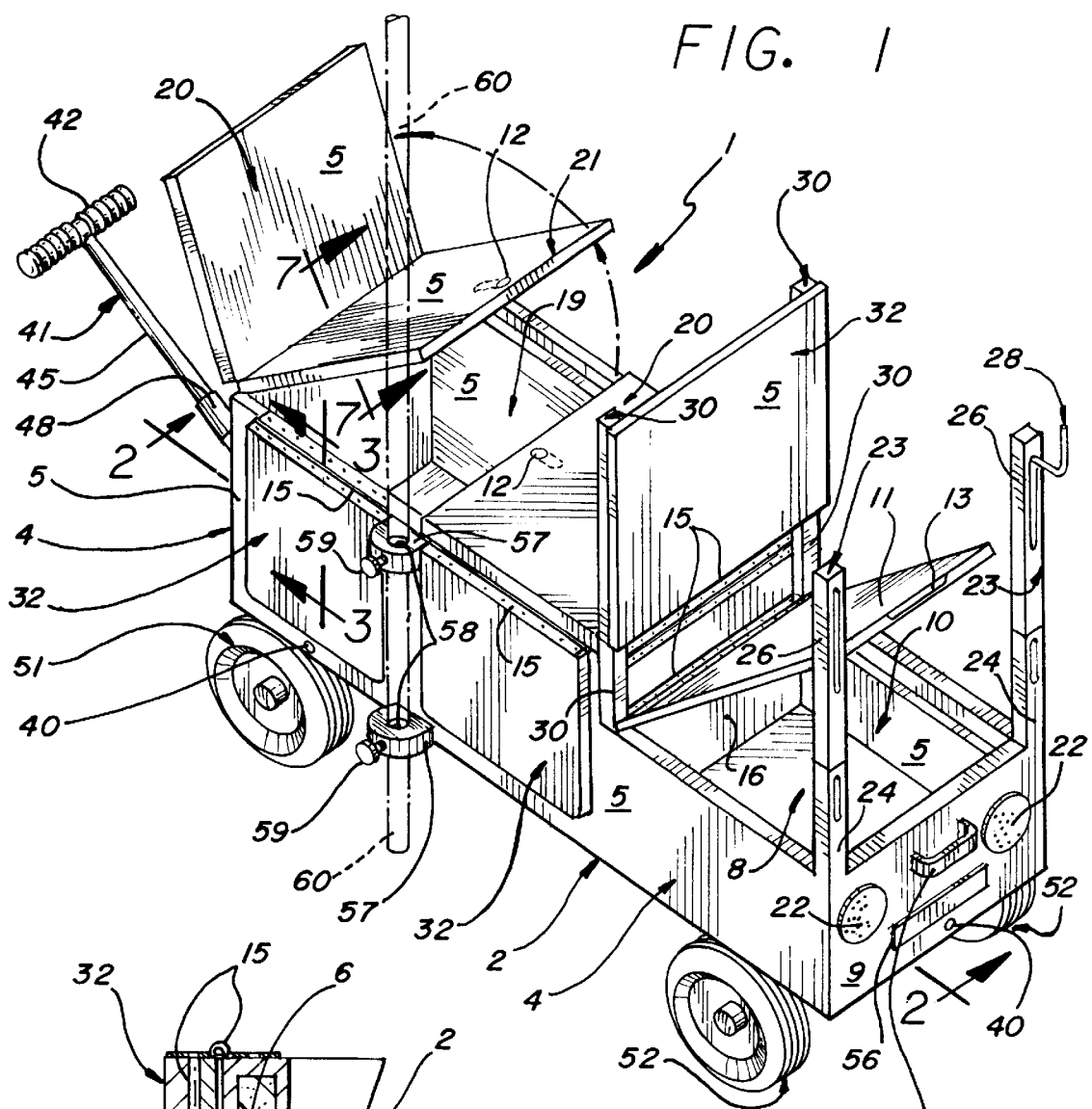
FIG. 1
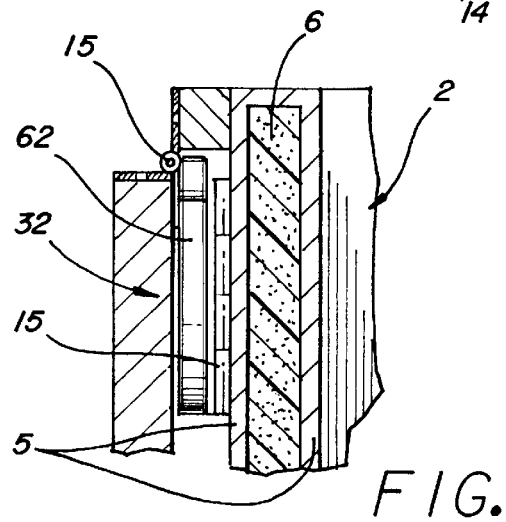
FIG. 3
FIG. 5

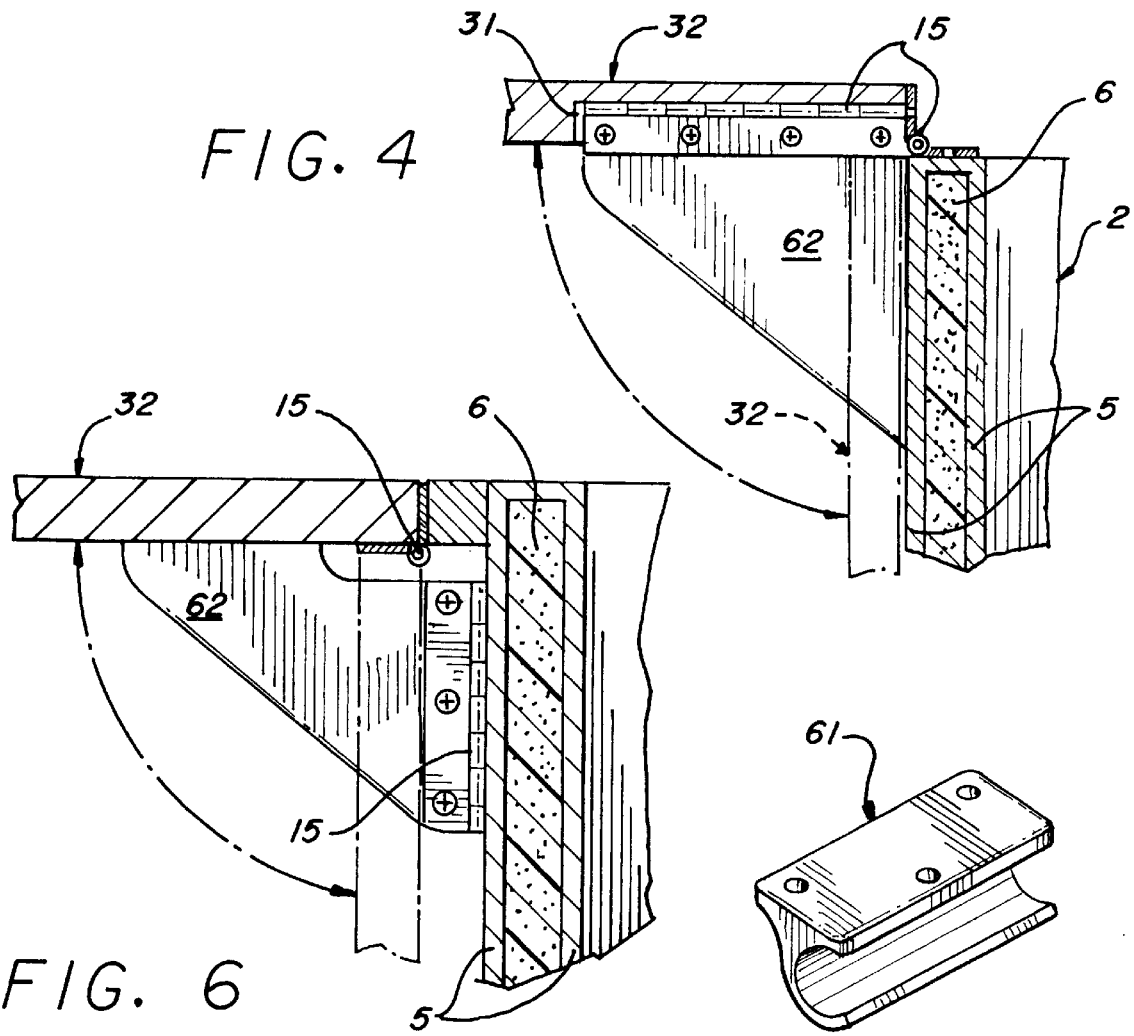
FIG. 4
FIG. 6
FIG. 8
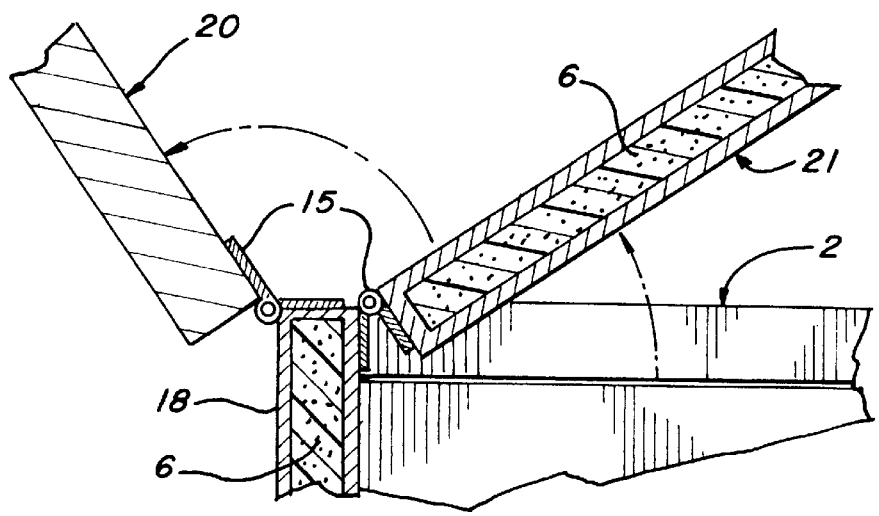
FIG. 7

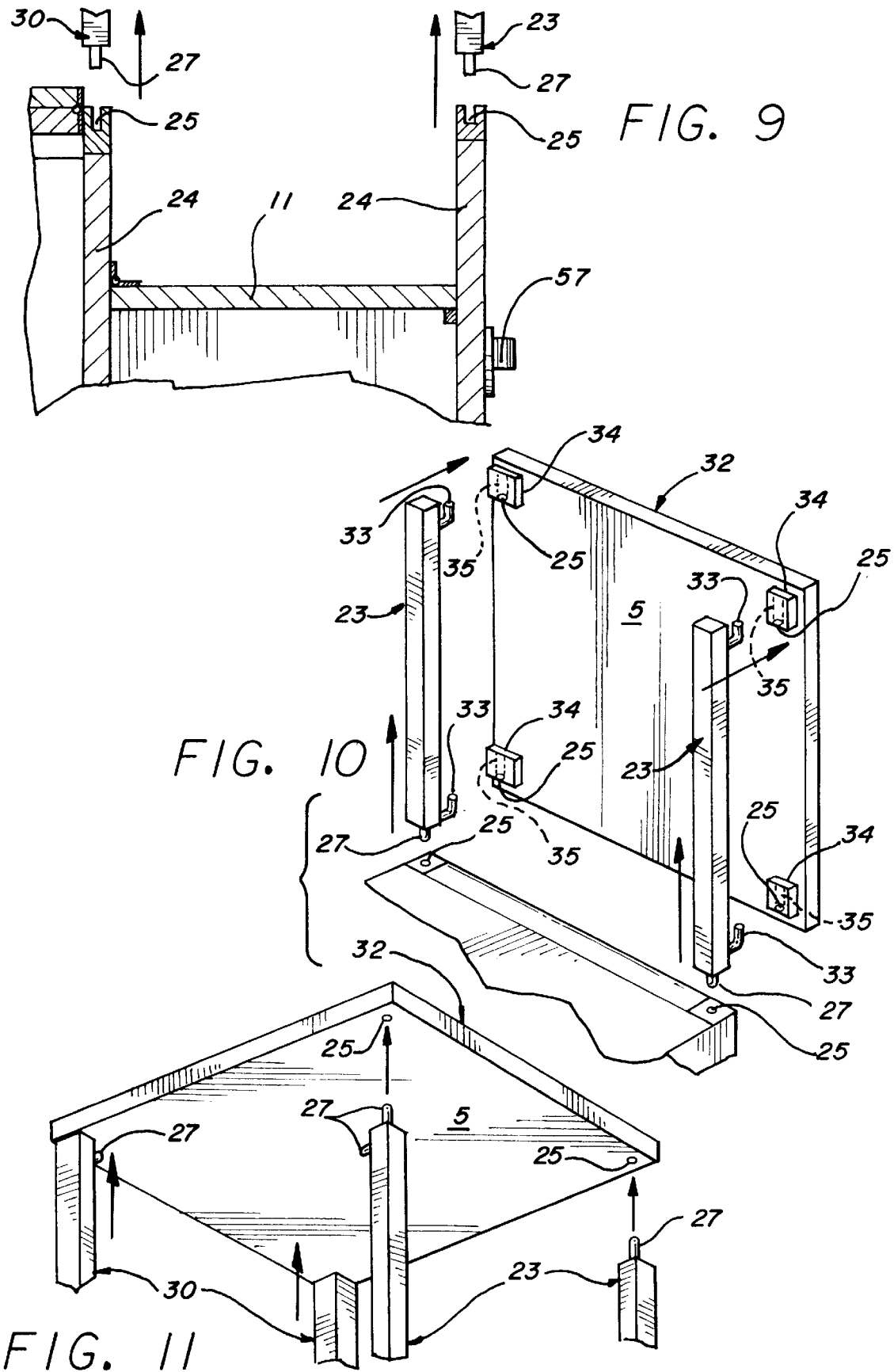

UTILITY CART

BACKGROUND OF THE INVENTION

1. Field of the Invention

This invention relates to utility containers, caddies and carts and more particularly, to a utility cart which is characterized in a first preferred embodiment by a cart frame fitted with a pair of spaced, fixed rear wheels and a pair of steerable front wheels connected to a pivoting, collapsible handle for steering purposes. The cart frame further includes an ice chest or ice chest receptacle accessible by dual hinged ice chest covers and lids, one of which covers doubles as a table, optionally supported by the collapsible handle in collapsed, pivoted configuration. The cart frame also includes a storage compartment lying adjacent to the ice chest and accessible by a hinged storage compartment lid, removable chair supports upward-standing in spaced relationship in the cart frame above the storage compartment for supporting a trash bag and an auxiliary table top and receiving one or more folding lawn chairs. A pair of drop leaf tables are hinged to the cart frame on at least one side of the ice chest for optionally pivoting into a horizontal position and engaging hinged supports, to serve as tables and a pair of vertically-aligned umbrella brackets are fitted with thumb screws for receiving an umbrella support and deploying an umbrella above the table tops. The table top which is removably supported by the upward-standing chair supports in stored configuration may be removed and attached by means of pegs to the four upward-standing chair supports to form an additional table top or working surface on the utility cart.

One of the problems which is realized in outings such as picnics, festivals, outdoor family reunions, beach activities, "tailgate" parties at football games and other athletic contests and outdoor gatherings is the facility for conveniently, effectively and comfortably serving various numbers of people. Outside activities of this nature are typically held under a canopy, a tree or in the shade of a structure such as a building to block the direct sunlight, and beverages are normally cooled in ice chests and coolers of various description which are hand-carried to the location and spread around the area. Trash and litter are normally deposited on the ground, or at best, in one or more trash bags lying adjacent to the ice chest and the guests usually bring their own folding chairs or stools for seating purposes, with little or no protection from the sun and rain. The primary problem with most of the various ice chests, lawn chairs, umbrellas, trash containers, miscellaneous food items and other utility items, is the failure to effectively and comfortably seat, feed, shade and protect the guests.

2. Description of the Prior Art

Various types of caddies, carts and other vehicles are known in the art. U.S. Pat. No. 3,677,571, dated Jul. 18, 1972, to T. F. Maturo, Jr., et al, details a "Beach Cart" which includes a collapsible, tubular frame that attaches to a carrying bag for storing articles. A roller is connected to the frame to allow transport of the cart through sand and the roller is constructed of annular end plates with a cylindrical mesh screen attached to the end plates. The frame includes extending arms for conveniently supporting a beach chair. U.S. Pat. No. 4,550,931, dated Nov. 5, 1985, to T. Ziaylek, Jr., details a "Wheeled Container", especially for use by firefighting and rescue squads. The wheeled container includes a rectangular base receptacle provided with recessed wheels at one end and a handle that telescopes to a non-use position, in order to impart to the receptacle a generally rectangular outer configuration, adapting it to fit into the small storage compartments in firefighting or rescue vehicles. The container is modular, which allows the addition of one or more receptacles in a stacked arrangement on the base receptacle and a cover is removably seated on either the base receptacle or, if several receptacles are stacked, upon the uppermost receptacle. A "Portable Wheeled Cooler Apparatus" is detailed in U.S. Pat. No. 4,724,681, dated Feb. 16, 1988, to Allan E. Bartholomew, et al. The apparatus includes a cooler chest assembly, a support wheel assembly upon which the cooler chest assembly is mounted and a combination handle and lock assembly connected to the coolant chest assembly to act as a lock in an enclosed condition, and a handle in transport condition. U.S. Pat. No. 4,863,075, dated Sep. 5, 1989, to Robert Romer, details a "Beach Caddy". The beach caddy is used for transporting and storing items for recreational use at the beach and is provided with runners for drawing across sandy surfaces and detachable wheels for rolling over paved surfaces. A refillable water tank within the caddy dispenses fluid for washing, drinking or any other desired use and an adjustable support is provided for retaining a beach umbrella and permitting the umbrella to be tilted in any desired direction. Detachable tables mounted on the sides of the caddy can be set up to support items transported by the caddy. A "Collapsible Cart Assembly" is detailed in U.S. Pat. No. 4,865,346, dated Sep. 12, 1989, to Ed Carlisle. The cart assembly is hand-propelled for use in support of activities such as picnics or beach activities and includes a separable wheeled frame having an upright section which includes upper and lower portions. A foldable shelf member on the lower portions supports a cooler chest and is provided with stabilizing elements which include lateral shifting of the chest during movement of the cart. A pair of arms on the lower portion accommodate one or more seating members such as folding chairs, while receiver elements retain umbrella and drink receptacles. The upper portion of the upright sections supports a container having a fold-down serving shelf adjacent to an accessory panel, presenting a radio, thermometer and other accessories. U.S. Pat. No. 4,976,448, dated Dec. 11, 1990, to Wayne M. Wickersham, et al, details a "Mobile Cooler Chest and Cooler Chest Support". The mobile cooler chest is constructed with a pair of ground-engaging wheels supporting one end of the chest. A U-shaped towing handle is pivotally mounted on the opposite end of the chest for movement between a projecting towing position and a downwardly-projecting standing position, in which the handle supports the chest in cooperation with the wheels in a stationary level position. A second embodiment of the mobile cooler chest includes a lid on the cooler chest, with a first chest having a lid in a bottom wall. A second chest has a bottom wall, with a mating perimeter bead and a projection formed on the second chest bottom wall and first chest lid for nesting the second chest to the first chest. The third embodiment includes a cooler chest support having a support member with a first end and a second end. An axle is mounted on the first end, with a wheel rotatably mounted on the axle and a pull handle is connected to the second end for pulling the cooler chest support.

Additional patents known to applicant are as follows: U.S. Pat. No. 1,176,106, dated Mar. 21, 1916, to C. F. True; U.S. Pat. No. 2,603,500, dated Jul. 15, 1952, to A. J. Messier; U.S. Pat. No. 3,874,531, dated Apr. 1, 1975, to William D. Mayo; U.S. Pat. No. 3,889,967, dated Jun. 17, 1975, to Elmer E. Sauer; Design U.S. Pat. No. 183,950 dated Nov. 18, 1958, to H. George Skaller; U.S. Pat. No. 1,375,121, dated Apr. 19, 1921, to C. E. Swartzbaugh; U.S. Pat. No.

1,455,395, dated May 15, 1923, to M. E. Exum; U.S. Pat. No. 1,654,330, dated Dec. 27, 1927, to C. E. Jenkins; U.S. Pat. No. 1,760,854, dated May 27, 1930, to M. Wright; U.S. Pat. No. 2,193,411, dated Mar. 12, 1940, to R. O. Sheldon; U.S. Pat. No. 2,771,318, dated Nov. 20, 1956, to C. F. Jagsch; U.S. Pat. No. 3,591,194, dated Jul. 6, 1971, to Philip Vega; U.S. Pat. No. 3,873,114, dated Mar. 25, 1975, to Rilma L. Brown; U.S. Pat. No. 3,940,175, dated Feb. 24, 1976, to Jimmy R. Robison; U.S. Pat. No. 5,306,029, dated Apr. 26, 1994, to Ronald R. Kaiser II; my own U.S. Pat. No. 5,380,022, dated Jan. 10, 1995, and U.S. Pat. No. 5,465,988, dated Nov. 14, 1995; and Italian Patent No. 435,595, dated Dec. 11, 1947, to Siera.

There is a need for a lightweight, compact utility cart fitted with an ice chest or ice chest receptacle having dual covers and lid covers, a storage compartment for miscellaneous accessories, removable chair supports for supporting folding lawn chairs, an auxiliary table top and a trash bag or bags, as well as folding, hinged drop leaf tables adapted for extension to accommodate several people during meals, a collapsible handle and an umbrella for shading the occupants of the table tops and protecting them from rain. It is therefore an object of this invention to provide a utility cart having these features.

Another object of this invention is to provide a new and improved utility cart which is characterized by a compact, lightweight cart frame fitted with a pair of fixed rear wheels and steerable front wheels connected to a pivoted, collapsible handle and having a built-in ice chest or ice chest receptacle for receiving an ice chest specifically designed for the purpose, or a conventional ice chest, as well as a storage compartment, upward-standing, removable chair supports for supporting an auxiliary table top, one or more trash bags and accommodating folded lawn chairs or the like, as well as hinged, folding drop leaf-type tables for receiving guests during meals and umbrella brackets for removably and adjustably receiving one or more umbrellas and protecting the occupants of the tables.

Yet another object of this invention is to provide a wheeled utility cart, the front wheels of which are steerable by a collapsing handle that optionally serves in collapsed configuration to support a hinged ice chest lid cover as a table top, the cart frame of which is constructed of an expanded foam insulation sandwiched between panel plates or sheets to provide superior strength with reduced weight and superior insulating qualities.

Still another object of this invention is to provide a versatile utility cart for use at parties, festivals, picnics, beach activities, athletic "tailgate" gatherings, and like occasions, which utility cart includes a wheeled cart frame, the front wheels of which are pivotally attached to the frame and are steerable by means of a collapsible pivotable handle, and the rear wheels fixed. The cart frame further includes at least one lifting handle, an insulated ice chest or ice chest receptacle fitted with insulated hinge lids and covers, one of which covers doubles as a table when pivoted against the collapsible towing handle, as well as two or more hinged drop leaf tables arranged for deployment upwardly in horizontal functional configuration and supported by pivotable supports, to serve breakfast, lunch or dinner guests and adjustable downwardly in non-functional folded configuration. One or more umbrellas for shading the guests and providing protection from the rain and a storage or utility compartment complete the utility cart.

SUMMARY OF THE INVENTION

These and other objects of the invention are provided in a new and improved utility cart fitted with four wheels, the rear two of which are fixed and the front steerable with a collapsible steering handle that can be pivoted and locked into elongated pulling configuration and unlocked and reverse-pivoted to optionally support a table top, and further including an insulated ice chest or ice chest receptacle having at least one pair, and preferably two pairs of insulated, hinged tops and covers, one of which covers optionally serves as the table top supported by the collapsed handle and also including a storage compartment positioned adjacent to the ice chest or ice chest receptacle and also fitted with a hinged top for storing accessory items. In a most preferred embodiment, four removable chair supports project upwardly from the cart frame above the storage compartment for receiving one or more folding lawn chairs or like supports and an auxiliary table top, a trash bag hook is mounted on at least one of the chair supports and two table tops are hinged to one side of the cart frame for deployment in upwardly, horizontal functional configuration and folded in non-functional configuration. A pair of vertically-aligned umbrella brackets optionally receive an umbrella support to deploy an umbrella over the utility cart, provide protection from the rain and shade the occupants at the tables when the tables are positioned in either the horizontal or vertical orientation.

BRIEF DESCRIPTION OF THE DRAWINGS

The invention will be better understood by reference to the accompanying drawings, wherein:

FIG. 1 is a perspective view of a preferred embodiment of the utility cart of this invention;

FIG. 3 is a sectional view taken along line 3—3, of a first embodiment of one of the drop leaf tables provided in folded configuration in the utility cart illustrated in FIG. 1;

FIG. 4 is a sectional view of the drop leaf table illustrated in FIG. 3 in deployed configuration;

FIG. 5 is a sectional view taken along line 3—3, of a second embodiment of the drop leaf table illustrated in FIG. 1;

FIG. 6 is a sectional view of the drop leaf table illustrated in FIG. 5 in deployed configuration;

FIG. 7 is an enlarged sectional view of a preferred embodiment of the dual lid covers and lids for covering the ice chest or ice chest receptacle in the utility cart illustrated in FIG. 1;

FIG. 8 is a perspective view of a preferred table top retainer bracket provided on one of the ice chest lid covers for receiving the handle grip of the collapsed handle when an ice chest lid cover is deployed in functional configuration as a table top;

FIG. 9 is a sectional view of the rear portion of the utility cart illustrated in FIG. 1, more particularly illustrating a preferred attachment of the respective rear chair supports and front chair supports to the corresponding support pedestals of the utility cart;

FIG. 10 is a perspective view of a preferred embodiment for mounting an auxiliary table top to the rear chair supports in non-functional, stored configuration;

FIG. 11 is a perspective view, partially in section, of a preferred mounting of the optional table top illustrated in FIG. 2 on the rear chair supports and the front chair support in functional, horizontal configuration;

DESCRIPTION OF THE PREFERRED EMBODIMENTS

Figure 2:
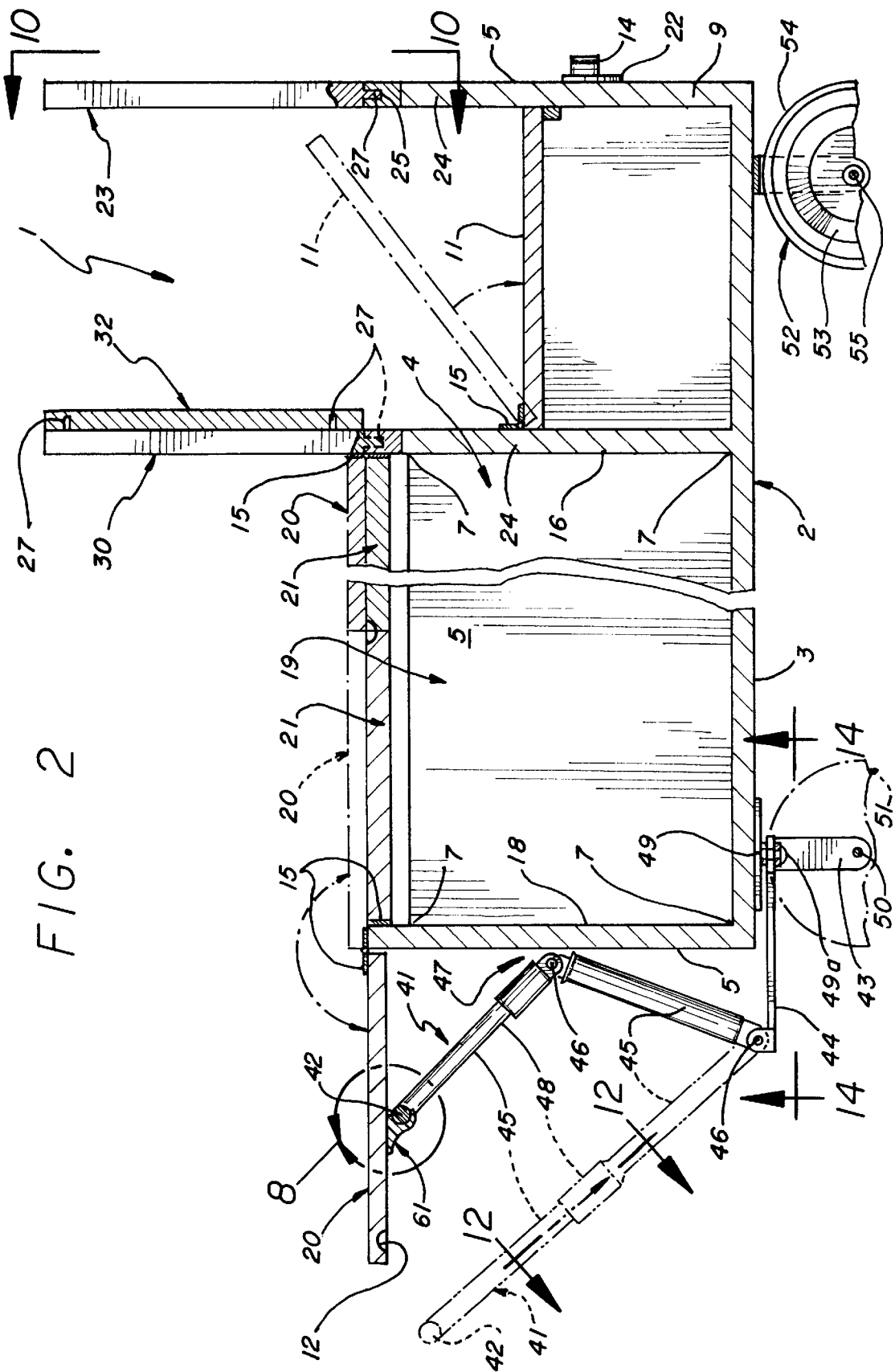
FIG. 2 is a longitudinal sectional view taken along line 2—2 of the utility cart illustrated in FIG. 1.

Referring initially to FIGS. 1 and 2 of the drawings, in a first preferred embodiment the utility cart of this invention is generally illustrated by reference numeral 1. The utility cart 1 is characterized by a cart frame 2, fitted with a metal longitudinal frame supports 3, each encapsulated in a panel plate 5, as illustrated in FIGS. 1 and 2. Accordingly, the side panels 4, bottom panel 8, storage end panel 9, separator panel 16 and front panel 18, as well as other components of the cart frame 2, are most preferably constructed of an expanded foam insulation such as "Styrofoam" or expanded polyurethane insulation 6, which is encapsulated by molded, plastic panel plates 5 to create superior strength and insulated characteristics for the utility cart 1. The cart frame 2 is shaped and molded by techniques known to those skilled in the art to define plate bands 7 in the panel plates 5 at the point of juncture at the side panels 4, bottom panel 8, storage end panel 9, separator panel 16 and front panel 18, respectively, which construction eliminates sharp edges, produces an esthetically-pleasing appearance and maintains good insulation qualities. The side panels 4, front panel 18 and separator panel 16 define an ice chest 19, which can also serve as an ice chest receptacle. The ice chest 19 is preferably closed by a pair of ice chest lids 21, which are hinged to the front panel 18 and the separator panel 16 by means of piano hinges 15 and a pair of ice chest lid covers 20, which fit over the ice chest lids 21, respectively, and are likewise hinged by means of piano hinges 15 to the front panel 18 and the separator panel 16, as illustrated in FIGS. 1 and 2. Alternatively, a single ice chest lid cover 20 and ice chest lid 21 can be used to close the ice chest 19. Finger openings 12 are shaped in both the ice chest lid covers 20 and the ice chest lids 21 to facilitate opening these elements of the utility cart 1, as desired. In a preferred embodiment of the invention the ice chest lid covers 20 and the ice chest lids 21 are constructed of the same expanded foam insulation 6 and panel plates 5 as the remaining elements of the cart frame 2, as described above. It will be appreciated by those skilled in the art that although piano hinges 15 are illustrated in the drawing for hinging the respective ice chest lid covers 20 and ice chest lids 21, vinyl hinges may likewise be used, such as those hinges which are used in the popular "Igloo" ice chest well known to those skilled in the art.

A locking storage compartment 10 is constructed adjacent to and rearwardly of the rear ice chest 20 and includes a storage compartment lid 11, also fitted with piano or vinyl hinges 15 for hingedly connecting the storage compartment lid 11 to the cart frame 2. A pair of corresponding finger openings 12 are provided in the storage compartment lid 11 to facilitate easy lifting of the storage compartment lid 11 with respect to the storage compartment 10, as illustrated in FIG. 1. A lock 13 may also be provided in the storage compartment lid 11 for engaging the storage end panel 9 in conventional fashion when the storage compartment lid 11 is closed on the storage compartment 10. A rear handle 14 is also attached to the storage end panel 9 and a front handle (not illustrated) may be similarly secured to the opposite end of the utility cart 1 at the front panel 18, as desired. Reflectors 22 may also be provided on the storage end panel 9 to facilitate better viewing of the utility cart 1 at night, as well as one or more identification plates (not illustrated).

Referring again to FIGS. 1 and 2 and to FIGS. 9–11 of the drawings, in a most preferred embodiment of the invention a pair of removable rear chair supports 23 project upwardly from the cart frame 2 at the storage end panel 9 in spaced, parallel relationship. In a most preferred embodiment, each of the rear chair supports 23 is characterized by a support pedestal 24, extending from the cart frame 2 at the storage end panel 9 and a corresponding vertical peg 27, which is inserted in a corresponding vertical peg opening 25 provided in the support pedestal 24, respectively, as illustrated in FIG. 2. Furthermore, a pair of front chair supports 30 project upwardly in like manner from the support pedestal 24 of the cart frame 2 in spaced relationship with respect to each other and to the parallel rear chair supports 23, to define a storage space above the storage compartment 10 and between the respective sets of rear chair supports 23 and front chair supports 30 for stacking folding lawn chairs or the like (not illustrated). In another preferred embodiment of the invention a trash bag hook 28 is attached to one or more of the rear chair supports 23 for suspending a trash bag (not illustrated) in convenient functional configuration on the utility cart 1.

Referring again to FIGS. 1 and 2 and to FIGS. 3–6 of the drawings, in a most preferred embodiment of the invention two drop leaf tables 32 are independently connected to the side panels 4 of the cart frame 2 by means of additional piano or vinyl hinges 15. Each of the drop leaf tables 32 is further characterized by a pivoting table top support 62, either hinged to the corresponding panel plate 5 of the utility cart 1 (FIGS. 5 and 6) or to the table top support 62 (FIGS. 3 and 4) and folded parallel to the utility cart 1, as illustrated in FIGS. 3 and 5. Accordingly, it will be appreciated that the drop leaf tables 32, or either of them, may be extended outwardly in substantially horizontal configuration on the supporting piano or vinyl hinges 15 as illustrated in FIGS. 4 and 6, with the pivoting table tops support 62 pivoted on each corresponding piano or vinyl hinge 15 into supporting configuration beneath the respective drop leaf tables 32, as illustrated in FIG. 4. It will be appreciated that in a preferred embodiment the pivoting table top support 62 is attached to the respective table tops 32 in a recess 31 provided in the table tops 32, respectively, as illustrated in FIGS. 3 and 4. Accordingly, in this configuration, the pivoting table top support 62 may be pivoted from the respective table tops 32 as the table tops 32 are, in turn, pivoted upwardly in horizontal configuration as illustrated in FIG. 4, to support one or more of the drop leaf tables 32, as illustrated.

Referring now to FIGS. 1, 2 and 7 of the drawings, in another preferred embodiment of the invention the ice chest lid cover 20 which is hinged to the front of the utility cart 1 at the front panel 18, serves the dual purpose of covering the corresponding ice chest lid 21 to insulate the ice chest 19, and as a table top when pivotally configured on the piano or vinyl hinge 15, as illustrated in FIG. 2. Accordingly, the ice chest lid cover 20 can be pivoted on the corresponding piano or vinyl hinge 15 to the position illustrated in FIG. 2 and supported by the collapsed towing handle 41, as the handle grip 42 of the towing handle 41 engages the curved receiving face of the table top retainer bracket 61, mounted on the ice chest lid cover 20 and the extension hinge 47 contacts the panel plate 5 of the front panel 18 in supporting configuration.

Figure 14:
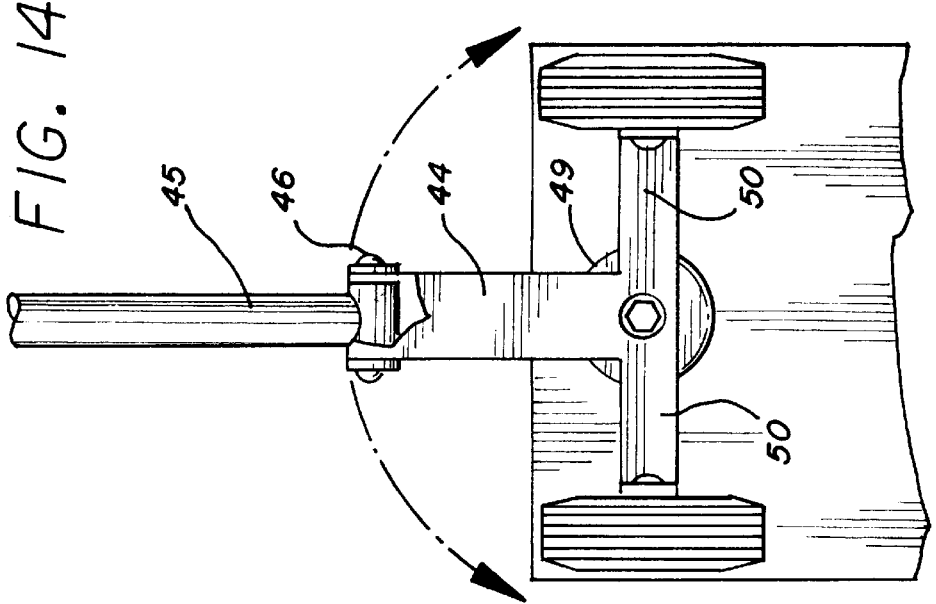
FIG. 14 is a bottom view of the front portion of the utility cart illustrated in FIG. 1, more particularly illustrating the pivoting function of the front axle and front wheels and a handle extension element of the collapsible towing handle.
Figure 12:
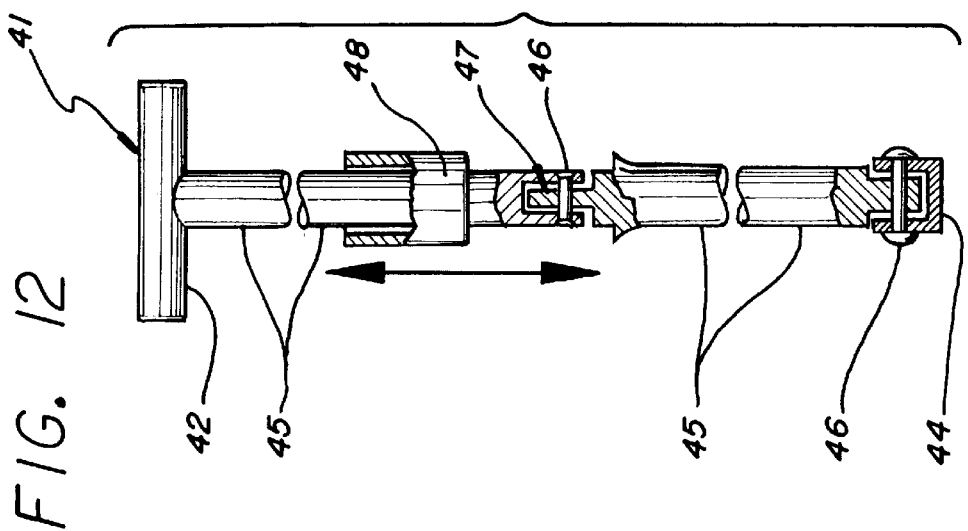
FIG. 12 is an enlarged view, partially in section, more particularly illustrating a preferred collapsible towing handle for towing the utility cart illustrated in FIG. 1.

Referring again to FIGS. 1 and 2 and to FIGS. 12 and 13 of the drawings, in a most preferred embodiment of the invention the towing handle 41 may be extended from the collapsed, supporting configuration illustrated in FIG. 2 into the towing configuration illustrated in FIG. 1 and in phantom in FIG. 2, by first extending the handle extensions 45 in alignment with each other and subsequently sliding the extension collar 48 into position over the extension hinge 47, as illustrated in phantom in FIG. 2 and FIG. 13, to lock the towing handle 41 and facilitate towing of the utility cart 1. As further illustrated in FIGS. 8 and 14, a wheel pivot 44 is connected to one of the handle extensions 45 and extends to the front axle 50, which is pivotally attached to the wheel support 49, as illustrated in FIG. 14. In a preferred embodiment of the invention this handle extension 45 is connected to the wheel pivot 44 by means of a hinge pin 46 to facilitate up-and-down pivotal movement of the towing handle 41 as the utility cart 1 is towed.

In a most preferred embodiment of the invention the front wheels 51 and rear wheels 52, mounted on the front axle 50 and the rear axle 55, respectively, of the cart frame 2 of the utility cart 1, are each characterized by high-impact, plastic wheel rims 53, each fitted with a rubber tire 54 on the perimeter thereof to reduce shock during towing. Moreover, as further illustrated in FIG. 1, a pair of umbrella brackets 57 are attached to the side panels 4 and include vertically-aligned support openings 58, with a thumb screw 59 extending into the support openings 58, respectively. These brackets removably receive the umbrella support 60 of an umbrella (illustrated in phantom in FIG. 1) for shading and protecting the utility cart 1 from the elements.

In another preferred embodiment of the invention and referring again to FIG. 2 of the drawings, the ice chest 19 can be sized to receive an ice chest (not illustrated) which is specifically designed for the purpose or a commercial box such as the popular "Igloo" ice chest, in non-exclusive particular. Accordingly, the ice chest may be selected to fit in the ice chest 19 with about ¼ inch clearance for easy insertion and removal.

Referring again to FIGS. 1, 2, 10 and 11 of the drawings, in another most preferred embodiment of the invention an auxiliary table top 32 is removably attached to the upward-standing front chair supports 30 by means of corresponding pegs 27 (FIGS. 1 and 2) or to the rear chair supports 23 by means of mount hooks 33, which removably engage corresponding hook brackets 34 attached to the auxiliary table top 32 (FIG. 10). Peg openings 25 are also provided in the hook brackets 34 to accommodate the upward-standing pegs 27 provided on the rear chair supports 23 and front chair supports 30, in order to mount the table top 32 on the rear chair supports 23 and the front chair supports 30, as illustrated with respect to the auxiliary table top 32 illustrated in FIGS. 2 and 11. Accordingly, when in the configuration illustrated in FIG. 11, the auxiliary table top 32 in both embodiments provides additional table space for the utility cart 1.

Figure 13:
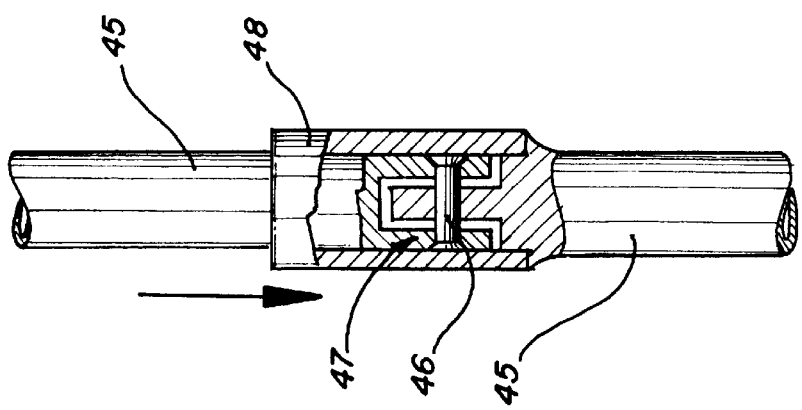
FIG. 13 is an enlarged view of the pivoting joint element of the collapsible towing handle illustrated in FIG. 12, more particularly illustrating positioning of the sliding extension collar in locked configuration to extend the handle extensions of the towing handle and facilitate towing of the utility cart.

In use, the utility cart 1 may be located in a desired place for picnic, beach activity, "tailgate" party, family reunion or similar outdoor outings and deployed in a specific position by grasping the handle grip 42 and the towing handle 41, extending the handle extensions 45 into alignment and relocating the extension collar 48 over the extension hinge 47, as illustrated in phantom in FIG. 2 and in FIG. 13, to maneuver the utility cart 1 into a desired location. Ice and beverages, as well as food can be added to the ice chest 19 or to an ice chest (not illustrated) placed in the ice chest 19, by first opening the ice chest lid covers 20 and then the ice chest lids 21, to access the ice chest 19. Various accessory equipment such as insect spray, table cloths, napkins, cups and the like, may be removed from the storage compartment 10 by opening the storage compartment lid 11. One or more of the drop leaf tables 32 may then be raised to accommodate folding lawn chairs, stools or the like (not illustrated) by first lifting the respective drop leaf tables 32 to the horizontal position and then pivotally deploying each pivoting table top support 62 beneath the table tops 32, as illustrated in FIGS. 4 and 6 of the drawings, depending upon the design utilized. A third table top can be created by pivoting the front one of the ice chest lid covers 20 from its position over the corresponding ice chest lid 21 into the position illustrated in FIG. 2, where it is supported by the collapsed towing handle 41. The towing handle 41 is collapsed into this supporting configuration by grasping the extension collar 48 and slipping it upwardly on the first handle extension 45 toward the towing handle 41 as illustrated in FIG. 12 to remove it from the extension hinge 47 and corresponding hinge pin 46, thus facilitating bending the respective handle extensions 45 on the hinge pin 46 at the extension hinge 47 into the configuration illustrated in FIG. 2, to support the repositioned ice chest lid cover 20. An umbrella can also be deployed on the utility cart 1 by slipping the umbrella support 60 through the vertically aligned support openings 58 in the spaced umbrella brackets 57 and tightening the thumb screws 59 to shade the extended drop leaf tables 32. While the umbrella is in this configuration and the drop leaf tables 32 are so extended, it will be appreciated that the ice chest lid covers 20 and the ice chest lids 21 can be opened as desired to remove beverage and/or food from the ice chest 19. Folded lawn chairs, stools or like seating equipment can then be removed from the space between the parallel rear chair supports 23 and front chair supports 30 by initially removing the respective front chair supports 30 and/or the rear chair supports 23, to provide easy access to the folding lawn chairs or the like. After removal of the chairs, the front chair supports 30 and rear chair supports 23 may be replaced and, if desired, the auxiliary table top 32 can be removed from its position on the pegs 27 (FIGS. 1 and 2) or the mount hooks 33 (FIG. 10) and positioned as illustrated in FIG. 11 on the respective pegs 27, to serve as an additional space for placing napkins, forks, knives and the like. Should minor adjustments to the location of the utility cart be necessary, the rear handle 14 and front handle (not illustrated) may be grasped and the adjustments easily made without the necessity of extending and locking the towing handle 41 and towing the utility cart 1. This maneuver can also be made when it is desired to load the utility cart 1 in the trunk of a car or the bed of a pickup truck or other vehicle for transportation purposes. The drain holes 40, provide in the utility cart as illustrated in FIG. 1, facilitate easy drainage of the ice chest 19, as well as the storage compartment 10, upon removal of suitable drain plugs, not illustrated. An identification plate 56 can also be provided on the back of the cart frame 2, as further illustrated in FIG. 1, to identify the utility cart 1 according to the desire of the owner.

It will be appreciated by those skilled in the art that the utility cart of this invention is versatile and may be designed in several important variations of which those described herein are only exemplary. For example, any desired number of drop leaf tables 32 and one or more sets of umbrella brackets 57 may be provided to support one or more umbrellas. Moreover, the number of compartments and ice chest configurations in the ice chest 19 may vary with the anticipated need.

Accordingly, while the preferred embodiments of the invention have been described above, it will be recognized and understood that various other modifications may be made in the invention and the appended claims are intended to cover all such modifications which may fall within the spirit and scope of the invention.

Having described my invention with the particularity set forth above, what is claimed is:

1. A utility cart comprising a wheeled frame having a steering mechanism; at least one table means hingedly carried by said wheeled frame for selective deployment in substantially horizontal configuration; at least one ice chest means provided in said wheeled frame for insulating purposes; storage compartment means provided in said wheeled frame for storing accessories; and a selectively collapsible towing handle having a grip, a pair of handle extensions connected at a hinged joint, with one of said handle extensions connected to said grip and the other one of said handle extensions connected to the steering mechanism and a collar slidably mounted on said handle extensions for selectively extending from said hinged joint on one of said handle extensions and supporting said table means, and covering said hinged joint and locking said handle extensions into alignment.

2. The utility cart of claim 1 wherein said ice chest means comprises an ice chest receptacle shaped to removably receive an ice chest.

3. The utility cart of claim 1 comprising umbrella bracket means carried by said wheeled frame for removably receiving and supporting at least one umbrella.

4. The utility cart of claim 1 comprising at least one lifting handle provided on said wheeled frame for maneuvering said utility cart and a trash bag hook for removably supporting a trash bag.

5. The utility cart of claim 1 wherein said ice chest means comprises an ice chest, a pair of ice chest lids hingedly carried by said wheeled frame and a pair of ice chest lid covers hingedly carried by said wheeled frame and selectively covering said ice chest lids, with one of said lid covers selectively supported by said handle extensions for selectively opening and closing said ice chest.

6. The utility cart of claim 5 comprising:
   (a) chair support means carried by said wheeled frame in spaced relationship for supporting and carrying chairs on said utility cart; and
   (b) umbrella bracket means carried by said wheeled frame for removably receiving and supporting at least one umbrella.

7. The utility cart of claim 1 wherein said storage compartment means comprises a single storage compartment positioned adjacent to said ice chest means and a storage compartment cover hingedly carried by said frame for selectively opening and closing said storage compartment.

8. The utility cart of claim 7 wherein said ice chest means comprises an ice chest, a pair of ice chest lids hingedly carried by said wheeled frame and a pair of ice chest lid covers hingedly carried by said wheeled frame and selectively covering said ice chest lids, with one of said lid covers selectively supported by said handle extensions for selectively opening and closing said ice chest.

9. The utility cart of claim 8 comprising at least one lifting handle provided on said wheeled frame for maneuvering said utility cart and a trash bag hook for removably supporting a trash bag.

10. The utility cart of claim 1 comprising chair support means carried by said wheeled frame in spaced relationship for supporting and carrying chairs on said utility cart.

11. The utility cart of claim 10 wherein said chair support means comprises four chair supports disposed in upward-standing relationship on said wheeled frame and wherein at least two of said chair supports are each characterized by a fixed segment carried by said wheeled frame and a removable segment removably carried by said fixed segment.

12. The utility cart of claim 11 wherein said ice chest means comprises an ice chest, a pair of ice chest lids hingedly carried by said wheeled frame and a pair of ice chest lid covers hingedly carried by said wheeled frame and selectively covering said ice chest lids, with one of said lid covers selectively supported by said handle extensions for selectively opening and closing said ice chest.

13. The utility cart of claim 12 wherein said storage compartment means comprises a single storage compartment positioned adjacent to said ice chest means and a storage compartment cover hingedly carried by said frame for selectively opening and closing said storage compartment.

14. The utility cart of claim 13 comprising:
   (a) umbrella bracket means carried by said wheeled frame for removably receiving and supporting at least one umbrella;
   (b) at least one lifting handle provided on said wheeled frame for maneuvering said utility cart; and
   (c) a trash bag hook provided on at least one of said chair supports for receiving and supporting a trash bag.

15. The utility cart of claim 1 wherein said table means comprises at least one drop leaf table hingedly connected to said wheeled frame adjacent to said ice chest means, a recess provided in said drop leaf table and folding support means hingedly connected to said drop leaf table and normally deployed in said recess for selectively interconnecting said drop leaf table and said wheeled frame, respectively, and selectively deploying said drop leaf table in extended, substantially horizontal, functional configuration from said recess and in substantially vertical, folded configuration in said recess.

16. The utility cart of claim 15 wherein:
   (a) said ice chest means comprises an ice chest, a pair of ice chest lids hingedly carried by said wheel frame and a pair of ice chest lid covers hingedly carried by said wheel frame and selectively covering said ice chest lids, with one of said lid covers selectively supported by said handle extensions for selectively opening and closing said ice chest; and
   (b) said storage compartment means comprises a single storage compartment positioned adjacent to said ice chest and a storage compartment cover hingedly carried by said frame for selectively opening and closing said storage compartment and comprising chair support means carried by said wheeled frame in spaced relationship for supporting and carrying chairs on said utility cart.

17. The utility cart of claim 16 wherein said chair support means comprises four chair supports disposed in upward-standing relationship on said wheeled frame and wherein at least two of said chair supports are characterized by a fixed segment carried by said wheeled frame and a removable segment removably carried by said fixed segment, and comprising:
   (a) umbrella bracket means carried by said wheeled frame for removably receiving and supporting at least one umbrella;
   (b) at least one lifting handle provided on said wheeled frame for maneuvering said utility cart; and
   (c) a trash bag hook provided on at least one of said chair supports for receiving and supporting a trash bag.

18. The utility cart of claim 17 wherein at least said ice chest, said ice chest lids, said storage compartment, said storage compartment cover and said drop leaf table are constructed of an expanded foam material sandwiched between molded plastic sheets.

19. A utility cart comprising a frame having a front end and a rear end; a pair of wheels fixedly mounted on the rear end of said frame; a pair of front wheels pivotally carried by the front end of said frame; a selectively collapsible towing handle, including grip means, said towing handle comprising a pair of handle extensions connected at a hinged joint and a collar slidably mounted on said handle extensions for selectively slidably uncovering said hinged joint and collapsing said hinged joint against said frame, and said collar slidably covering said hinged joint and locking said handle extensions into alignment, with one of said handle extensions pivotally connected to said grip means for pulling said utility cart in towing mode, and the other end of said handle extensions carried by said front wheel for guiding and towing said utility cart; an ice chest receptacle provided on said front end of said frame for receiving an ice chest and a pair of ice chest lids and lid covers hingedly carried by said ice chest receptacle, wherein said handle extensions, in a collapsible mode, support one of said ice chest lid covers, with said ice chest lid cover selectively covering said ice chest lids, respectively, for selectively opening and closing access to the ice chest receptacle; at least two drop leaf tables hingedly carried by said frame and table support means pivotally carried by said drop leaf tables for selectively engaging said frame and selectively supporting said drop leaf tables in substantially horizontal relationship; a storage compartment provided on said rear end of said frame and a storage compartment lid hingedly carried by said frame for selectively opening and closing said storage compartment; and a plurality of chair supports disposed in upward-standing relationship on said frame, with at least two of said chair supports characterized by a fixed segment carried by said frame and a removable segment removably carried by said fixed segment, for supporting and carrying chairs on said utility cart.

20. The utility cart of claim 19 wherein
at least said ice chest receptacle, said ice chest receptacle cover, said storage compartment, said storage compartment cover and said table tops are constructed of an expanded foam material sandwiched between molded plastic sheets.

* * * * *